United States Patent [19]

Stammetti

[11] Patent Number: 4,891,036

[45] Date of Patent: Jan. 2, 1990

[54] MODIFIED DERAILLEUR

[76] Inventor: John J. Stammetti, 22636 Ocean Ave., #20, Torrance, Calif. 90505

[21] Appl. No.: 358,562

[22] Filed: May 26, 1989

[51] Int. Cl.[4] ............................................. F16H 9/00
[52] U.S. Cl. ...................................................... 474/82
[58] Field of Search .................................. 474/78–82; 280/238, 261

[56] References Cited

U.S. PATENT DOCUMENTS

| | | | |
|---|---|---|---|
| 2,139,397 | 12/1938 | Wigglesworth | 474/135 X |
| 2,491,121 | 10/1946 | Lozinski | 474/80 |
| 3,156,130 | 11/1964 | Gant | 474/151 |
| 3,890,847 | 6/1975 | Dian | 280/238 X |
| 4,198,873 | 4/1980 | Nagano et al. | 474/82 |
| 4,226,132 | 10/1980 | Nagano et al. | 474/82 |
| 4,305,711 | 12/1981 | Lannoch | 474/82 |
| 4,507,101 | 3/1985 | Nagano | 474/82 |
| 4,552,546 | 11/1985 | Ishikawa | 474/82 |
| 4,573,949 | 3/1986 | Nagano | 474/80 |
| 4,610,644 | 9/1986 | Nagano | 474/82 |
| 4,637,809 | 1/1987 | Nagano | 474/80 |
| 4,699,605 | 10/1987 | Jona | 474/82 |

Primary Examiner—Thuy M. Bui
Attorney, Agent, or Firm—Quirk, Tratos & Roethel

[57] ABSTRACT

A derailleur is provided with locking devices in the form of bands or ratchets around the upper and lower pivoting members of the derailleur to hold the derailleur securely in place during use and thus preventing the bicycle chain from disengaging from the chain sprocket or the chain wheels. The locking devices are activated/deactivated by a hand lever mounted on the handle bar of the bicycle. A cable runs from the hand lever through a spring arrangement to other cables that are connected to the locking devices.

51 Claims, 3 Drawing Sheets

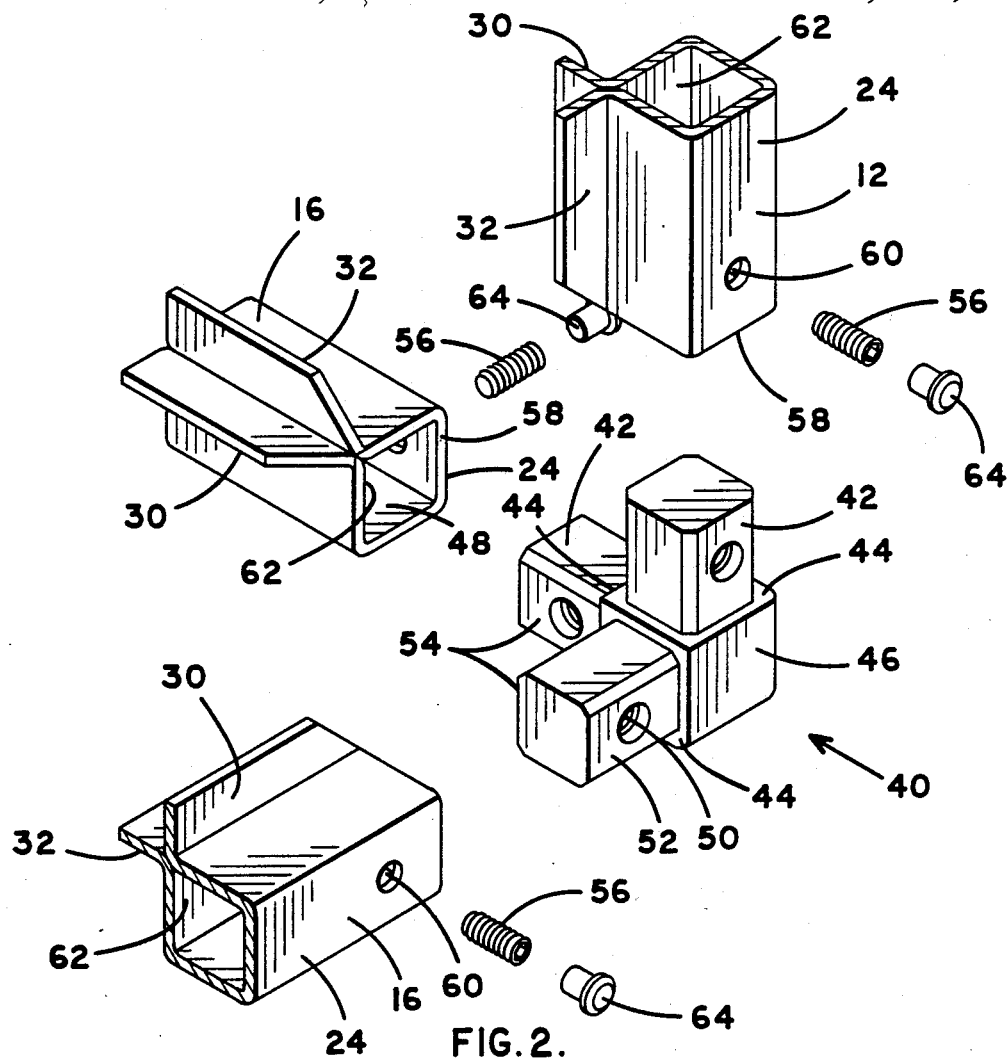
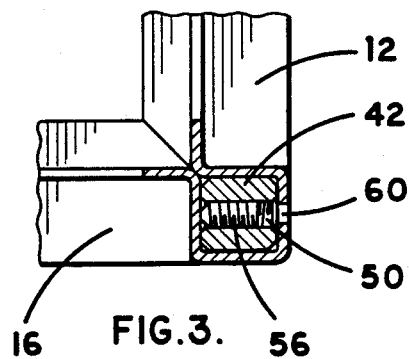
FIG. 2.
FIG. 3.

MODIFIED DERAILLEUR

BACKGROUND OF THE INVENTION

This invention relates to a modified derailleur for a multi-speed bicycle, and more particularly to a modified derailleur that is useful to prevent the chain from disengaging from the rear sprockets when the bicycle is used in rough terrain such as off road or mountain biking.

A typical derailleur is used to effect gear changes in a multi-speed bicycle. For example, in a ten speed bicycle, there are typically two different size chainwheels mounted on the crank spindle adjacent the pedals of the bicycle. Along the axle of the rear wheel, five sprockets of varying sizes are laterally mounted next to one another. The bicycle chain spans a particular chainwheel and a particular sprocket thereby effecting a particular gear ratio between the pedals and the rear wheel. Different combinations of the two chainwheels and the five rear sprockets results in ten possible gear ratios, thus a ten-speed bicycle.

A derailleur is used to provide a mechanism to move the bicycle chain from one of the rear sprockets to another of the rear sprockets thus changing the gear ratio of the bicycle. A gear lever is connected by a cable to the gear changer. When the rider desires to change to a higher gear ratio, the rider moves the gear lever which causes the cable to pull the derailleur outward against the action of a spring and the chain is shifted to a smaller sprocket. To change to a lower gear ratio, the derailleur is allowed to move inward by the action of the spring and this moves the chain to a larger rear sprocket.

It is detrimental to the normal operation of a bicycle to have the bicycle chain become disengaged from either the chainwheel or the rear sprocket. A standard derailleur uses a torsion spring at each of two vertical pivot points to place the chain under tension so that the chain will not inadvertently disconnect from the rear sprocket. The torsion springs must be strong enough to prevent this inadvertent movement, but not so strong as to prohibit the movement of the chain when shifting is desired.

Chain oscillation or chain play occurs when the bicycle is subject to a shock or a jolt such as would be encountered when the bicycle is being ridden over rough terrain as would normally be encountered in an off-road or mountain biking situation. If the shock or jolt is severe enough, the torsion springs will not hold the chain on the rear sprocket and the chain will come off resulting in the bicycle becoming inoperable. It is possible however to overcome this undesirable characteristic of standard derailleurs.

It is an object of the present invention to provide a positive locking mechanism to each of the two vertical pivot points of a derailleur assembly to prevent inadvertent chain oscillation or chain play when the derailleur encounters shocks or jolts from off-road or mountain biking.

It is a feature of the present invention to utilize a band lock or a ratchet lock on the pivot points, such as the rotating drum, of the derailleur to hold the derailleur securely in place. The band lock or ratchet lock is then released prior to shifting by activating a lever attached to the handle bars to permit the shifting to occur. Once a change in gear ratio has been achieved, the band lock or ratchet lock is reapplied by use of the lever to once again securely hold the derailleur during riding over rough terrain.

It is an advantage of the present invention that a derailleur is modified to prevent unwanted chain oscillation or chain play to increase the ability of a bicycle rider to traverse rough terrain often encountered in off-road or mountain biking situations.

SUMMARY OF THE INVENTION

The present invention involves the modification of a standard derailleur by the addition of a band lock or ratchet lock around the upper and lower pivot members of the derailleur to provide a resistance to rotary movement of the derailleur during use. The band lock or the ratchet lock is released by a cable activation assembly which includes a lever mechanism mounted on the handlebars of the bicycle. The lever mechanism is connected by a cable to a tension spring which in turn is connected by a cable to the band lock or ratchet lock. The lever mechanism can take the form of a friction thumb shifter or a ratchet thumb shifter, both of which may be provided with an adjustable mounting to vary the force necessary to activate the release mechanism.

DETAILED DESCRIPTION OF THE PREFERRED EMBODIMENTS

Figure 1:
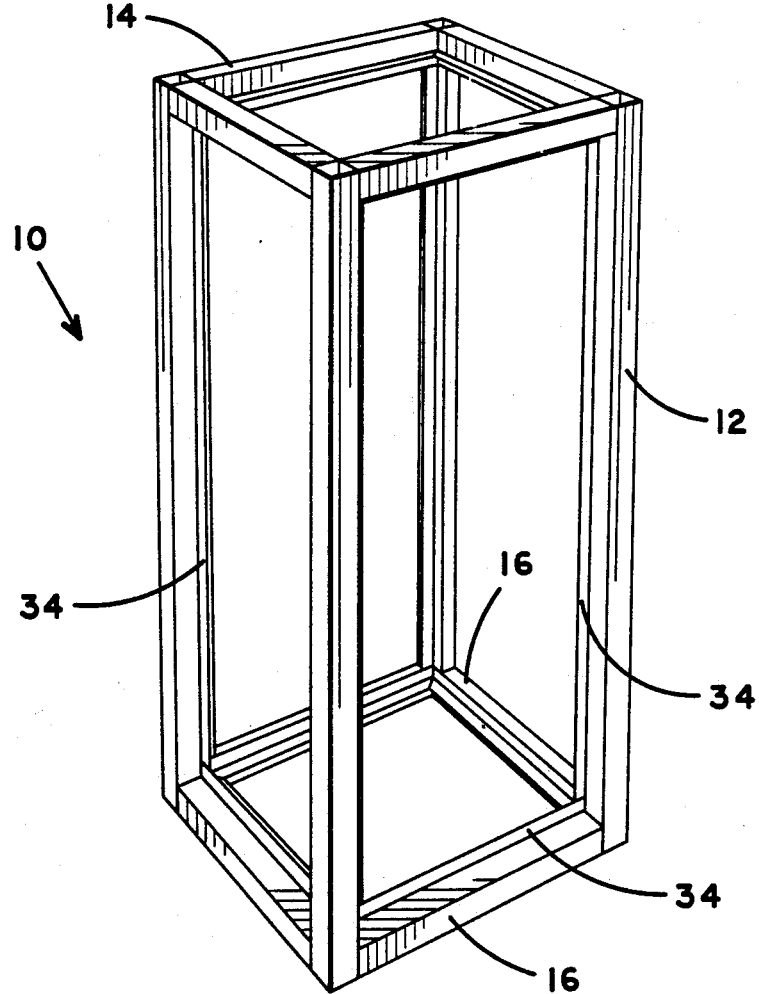
FIG. 1 shows a side view of a derailleur of the present invention showing the band locks mounted on the upper and lower pivot members of a derailleur.
Figures 1A, 1B:
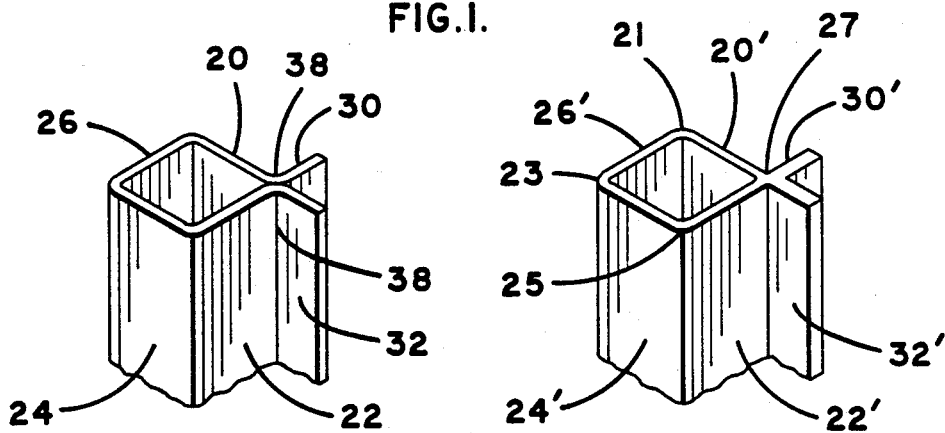

The derailleur 10 of the present invention is shown generally in FIG. 1. The derailleur 10 is attached to the body of the bicycle by means of a hanger plate 12 shown in phantom in FIG. 1. A slot 11 is provided on the hanger plate 12 to receive a bolt (not shown) to attach the hanger plate 12 to the bicycle. An upper pivot member 20 joins the hanger plate 12 to the rear end support 14 which provides the connection to allow pivotable movement between the derailleur 10 and the hanger plate 12. A lower pivot member 40 is provided on the front end support 16 which provides the connection to allow pivotable movement between the derailleur 10 and the chain cage 30. The rear end support 14 and front end support 16 are joined together by a parallelogram 18 which provides the necessary parallel movement of the derailleur 10. The arrangement so far described is typical of derailleur 10 assembly.

An upper band lock 22 is mounted around the upper pivot member 20 and a lower band lock 42 is mounted around the lower pivot member 40. In the embodiment shown in FIG. 1, the upper band lock 22 and the lower band lock 42 are fabricated from flexible band material, such as a metal strip. The metal strip contacting the surface of the pivot member provides a certain degree of friction to inhibit the pivot member from rotating. The degree of friction can be increased by machining or knurling the surface of the pivot member. The flexible band material may also be provided with a material that will increase the friction of the band, preferably a material such as rubber or a plastic coating.

When the upper band lock 22 and the lower band lock 42 are activated in a manner to be more fully described herein, the pivoting movement of the upper pivot member 20 and the lower pivot member 40 are inhibited, in effect locking the derailleur 10 in position and limiting the movement of the bicycle chain that is arrayed through the chain cage 30. This limiting of movement of the bicycle chain prevents the bicycle chain from becoming disengaged from the drive gear or the chain cage 30 when the rider encounters rough or uneven terrain in a mountain biking or off-road situation.

One end of the upper band lock 22 is connected to a mounting post 24 provided on the rear end support 14. The other end of the upper band lock 22 is fastened to a connecting member 26 which in turn is fastened to an upper cable 28. The upper cable 28 is covered by a outer sheath 29 that allows the upper cable 28 to slide within the outer sheath 29. The upper cable 28 acts to tension the upper band lock 22 around the upper pivot member 20 in a manner to be more fully described herein.

Similarly, one end of the lower band lock 42 is connected to a mounting post 24 which is mounted on the front end support 16. The other end of the lower band lock 42 is fastened to a connecting member 26 which is also connected to a lower cable 48. The lower cable 48 is covered by a outer sheath 49 that allows the lower cable 48 to slide within the outer sheath 49. The lower cable 48 also acts to tension the lower band lock 42 around the lower pivot member 40.

Figure 4:
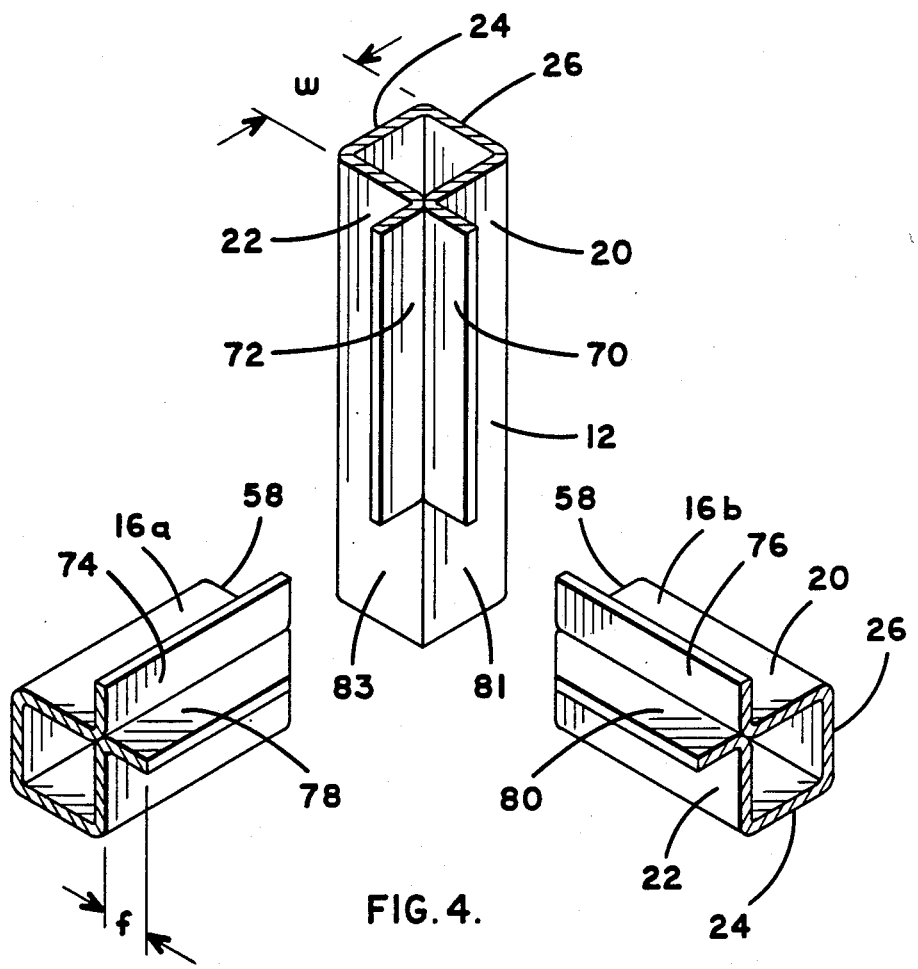
FIG. 4 shows the lever mechanism and the cable activation assembly of the modified derailleur of the present invention.
Figure 1:
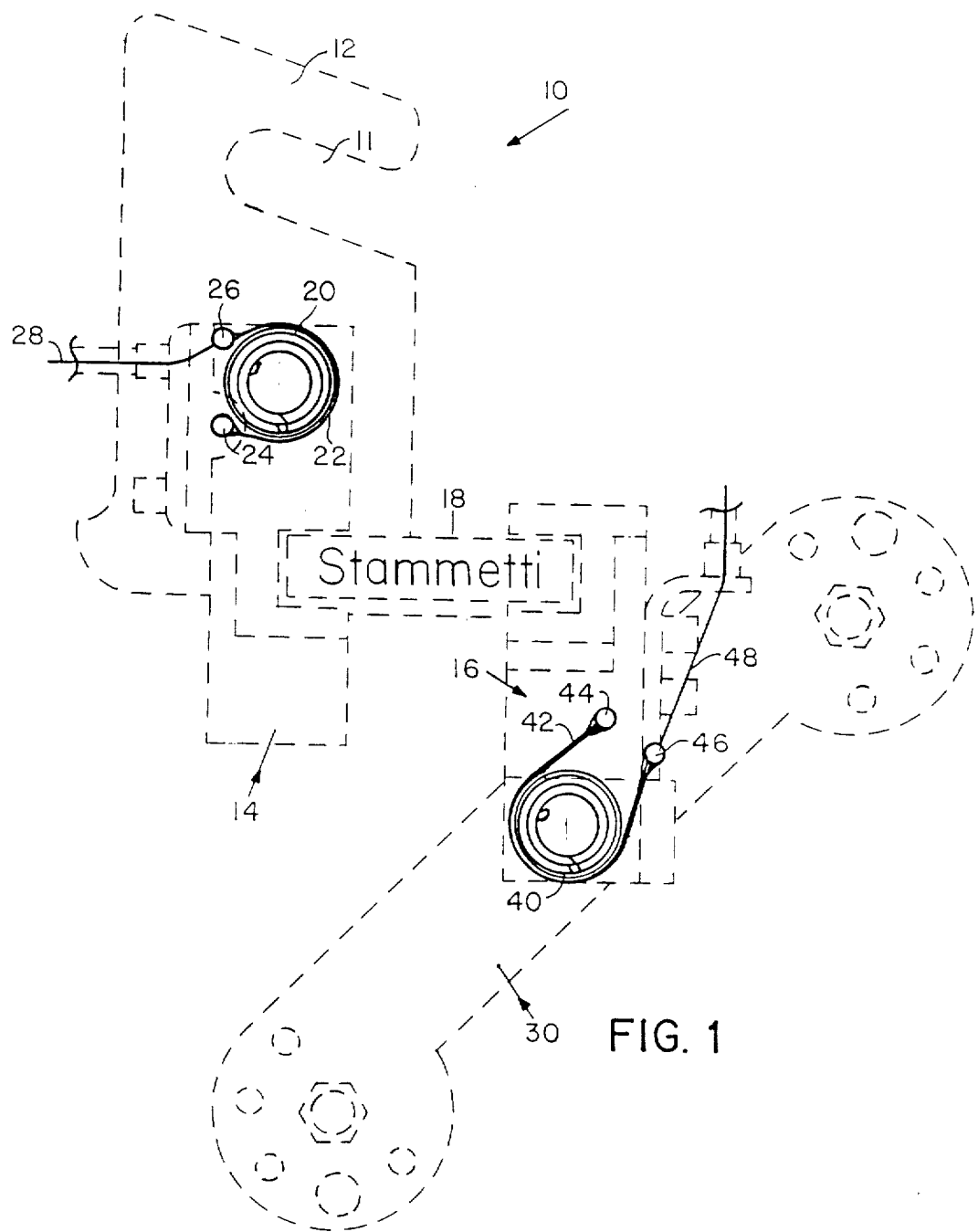
Figure 2:
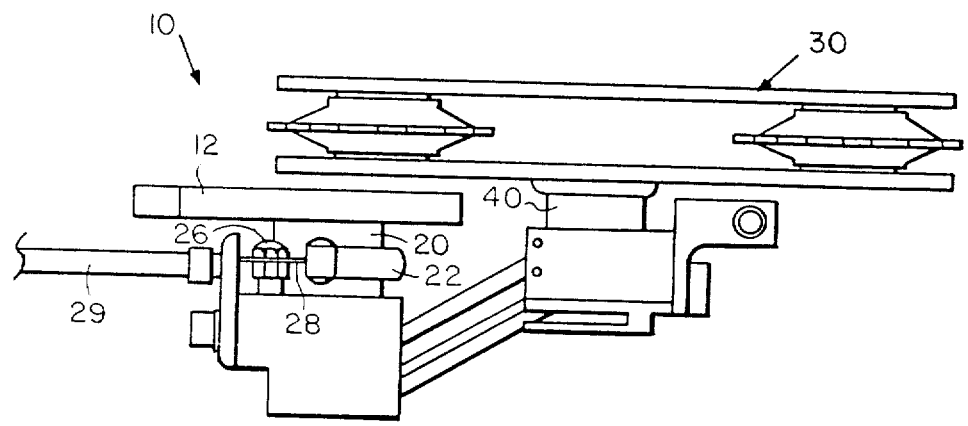
FIG. 2 shows a top view of a modified derailleur of the present invention showing the upper band lock.
Figure 3:
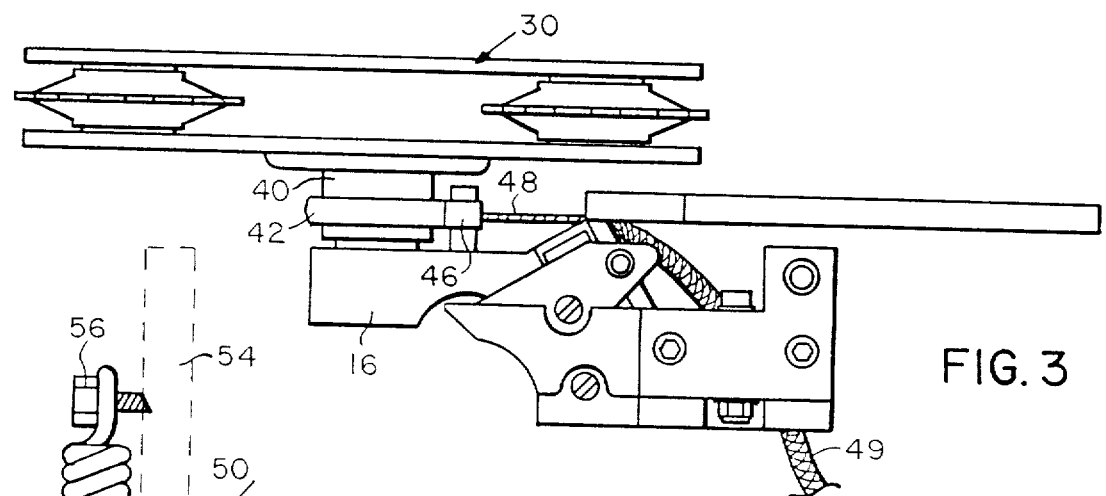
FIG. 3 shows a rear view of a modified derailleur of the present invention showing the lower band lock.
Figure 4:
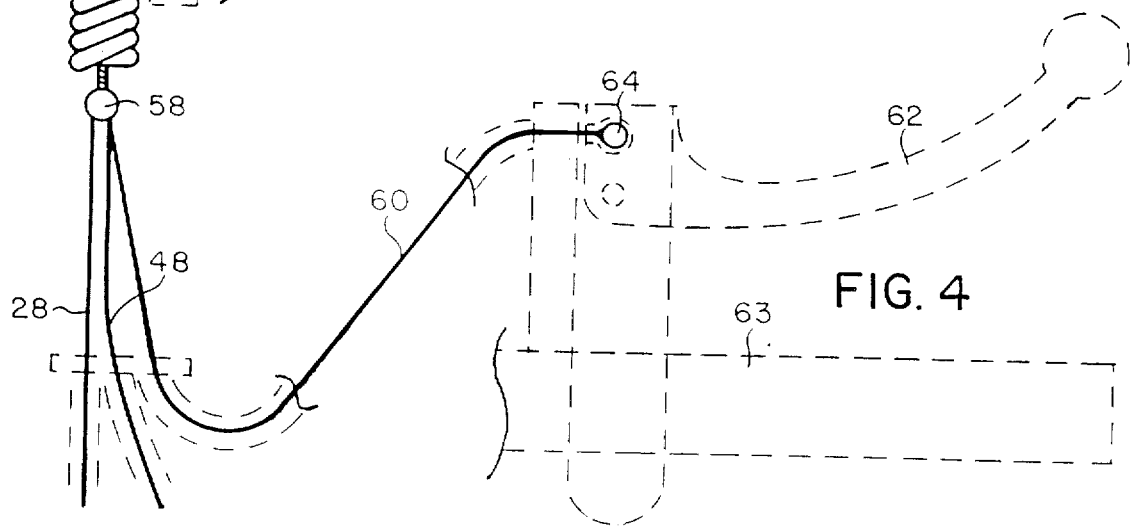

FIG. 4 shows the cable activation assembly 50 that activates the band locking mechanism of the present invention. The cable activation assembly 50 comprises a spring 52 that is connected to the bicycle frame 54 (shown in phantom) by means of a fastener 56. One end of the spring 52 is fastened to a connector 58 which in turn is connected to an end of the upper cable 28, the lower cable 48 and a lever cable 60. The other end of the lever cable 60 is joined at connection 64 to a handle bar lever 62 mounted on the handle bar 63 of the bicycle. In operation, the normal tension of the spring 52 on the end of the upper cable 28 and the lower cable 48 pulls the upper band lock 22 and the lower band lock 42 tight against the upper pivot member 20 and the lower pivot member 40, respectively. When the rider wishes to disengage the upper band lock 22 and the lower band lock 42 to allow for shifting of the gears by the usual operation of the derailleur 10, the rider first moves the handle bar lever 62 which pulls on the lever cable 60. This causes the spring 52 to be pulled in a downward direction which results in slack being created in the upper cable 28 and the lower cable 48. This slack is transmitted through the upper cable 28 and the lower cable 48 to the upper band lock 22 and the lower band lock 42, respectively. When slack occurs in the upper band lock 22 and the lower band lock 42, the resistance to movement of the upper pivot member 20 and the lower pivot member 40 is no longer present, which allows the upper pivot member 20 and the lower pivot member 40 to rotate. This ability to rotate permits the derailleur 10 to effect the desired gear shifting.

Figure 5A:
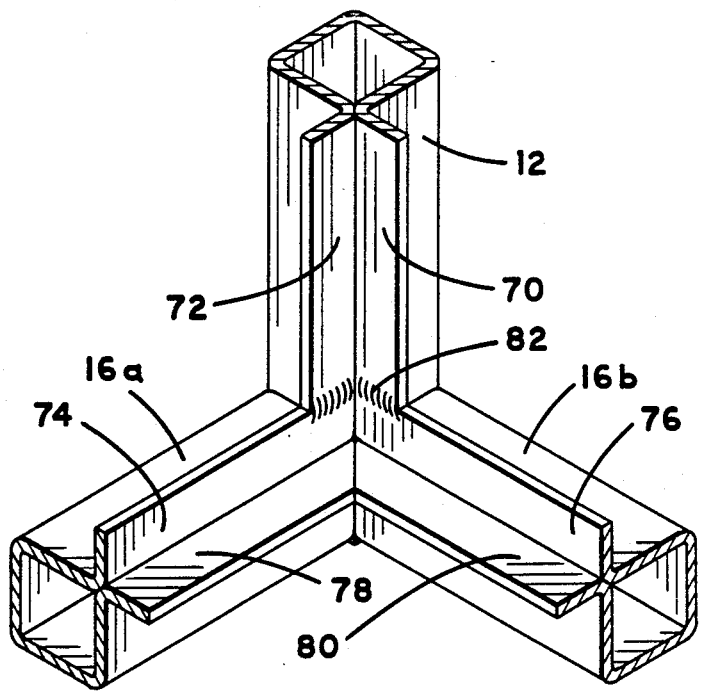
FIG. 5 shows the ratchet lock alternate embodiment of the present invention.
Figure 5B:
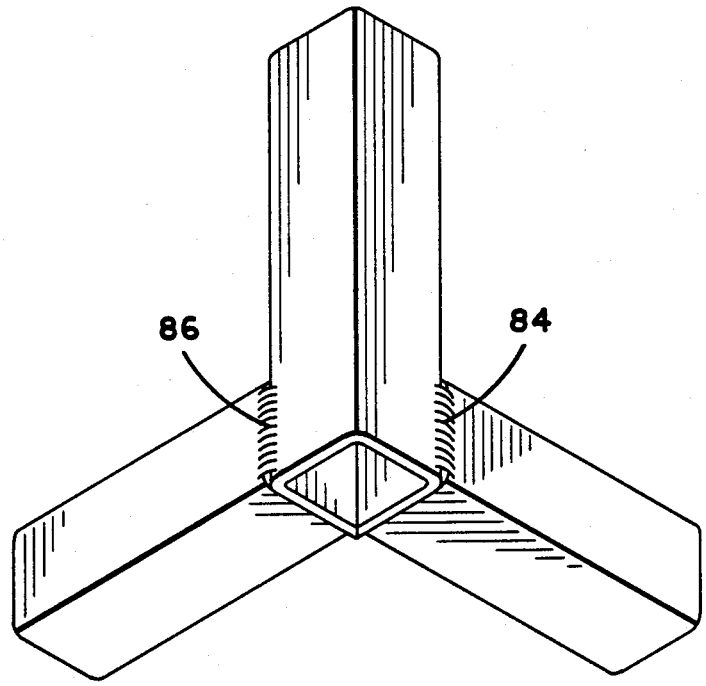
Figure 5:
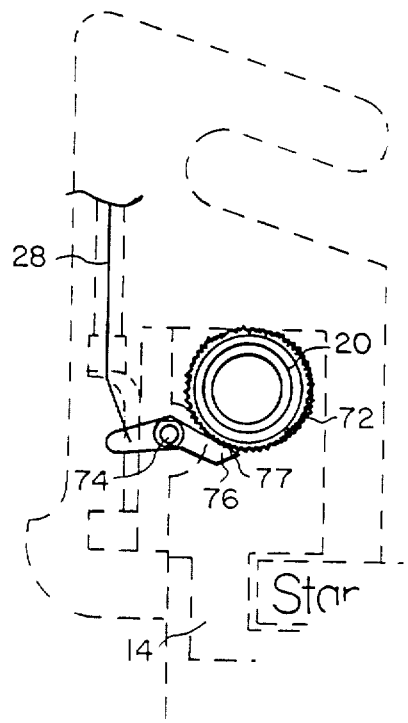

FIG. 5 shows an alternate embodiment of the present invention in which a pawl and ratchet assembly is used in place of the flexible metal locking bands. The upper pivot member 20 is provided around its entire periphery with teeth 72. A pawl 76 is pivotally attached at mounting post 74 to the rear end support 14. One end of pawl 76 is provided with pawl teeth 77 that cooperate with the teeth 72 on the upper pivot member 20. The other end of pawl 76 is connected to the upper cable 28. The connection of the pawl 76 to the mounting post 74 includes a tension spring (not shown) that biases the pawl teeth 77 against the teeth 72 on the upper pivot member 20.

Similarly, the lower pivot member 40 can be provided with a pawl and ratchet assembly connected to the lower cable 48. This pawl and ratchet assembly for the lower pivot member is the same design as shown in FIG. 5 for the upper pivot member.

In this embodiment it is not necessary to utilize the spring 52, but rather the upper cable 28 and the lower cable 48 can be directly connected to the handle bar lever to release the pawl teeth from the teeth on the upper and lower pivot members and permit the pivot members to rotate to allow the bicycle's gear to be changed.

Figure 6:
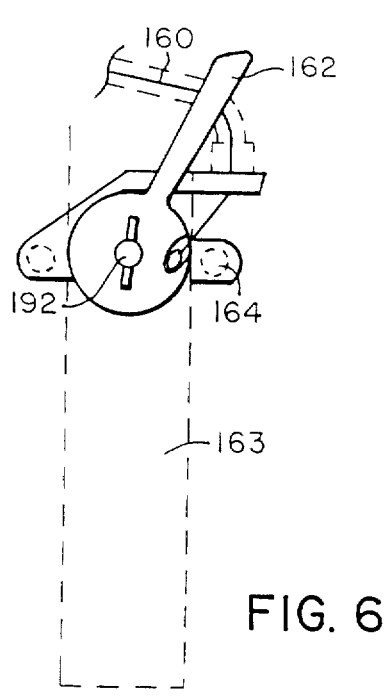
FIG. 6 shows the friction lever mechanism alternate embodiment of the present invention.

An alternate embodiment of the handle bar assembly is shown in FIG. 6. The handle bar lever 162 is mounted on the handle bar 163 of the bicycle by means of a conventional bracket assembly shown in phantom. The lever cable 160 is connected to the handle bar lever 162 at the connection 164. A fastener, preferably a wing nut 192, holds the lever 162 to the bracket assembly. The amount of force that the rider must use to activate the handle bar lever 162 is dependent upon how tightly the wing nut 192 is screwed into the bracket assembly.

Figure 7:
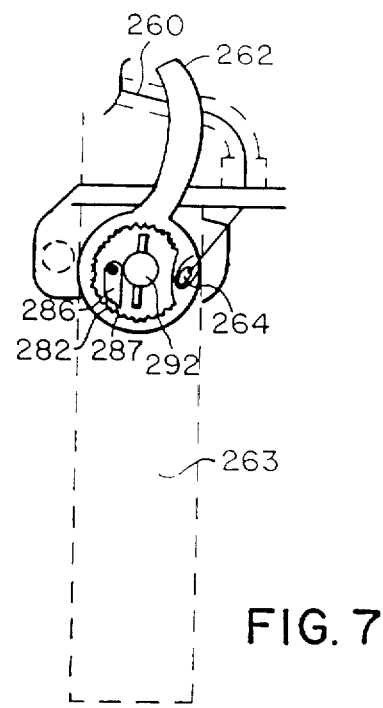
FIG. 7 shows the ratchet lever mechanism alternate embodiment of the present invention.

Another alternate embodiment of the handle bar assembly is shown in FIG. 7. The handle bar lever 262 is mounted on the handle bar 263 of the bicycle by means of a conventional bracket assembly shown in phantom. The lever cable 260 is connected to the handle bar lever 262 at the connection 264. A fastener, preferably a wing nut 292, holds the lever 162 to the bracket assembly and provides for the friction adjustment of the handle bar lever 262. On the perimeter of the handle bar lever 262, there are provided a series of ratchet teeth 282 which cooperate with a pawl 286. The pawl teeth 287 on the pawl 286 engage the ratchet teeth 282 to hold the handle bar lever 262 in a locked position and to prevent the handle bar lever 262 from inadvertently pivoting back. This assists in maintaining the tension on the locking bands which are preventing the upper pivot member and the lower pivot member from undesired movement which would cause chain disengagement.

It is possible to utilize the band lock arrangement interchangeably with the ratchet lock arrangement. For example, the upper lock can be a band lock while the lower lock can be a ratchet lock, or vice versa. If a band lock and a ratchet lock are used simultaneously, it will be necessary to selectively attach the appropriate cable to the spring 52 to activate the band lock and to bypass the spring 52 and connect the cable directly to the handle bar lever to activate the ratchet lock.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

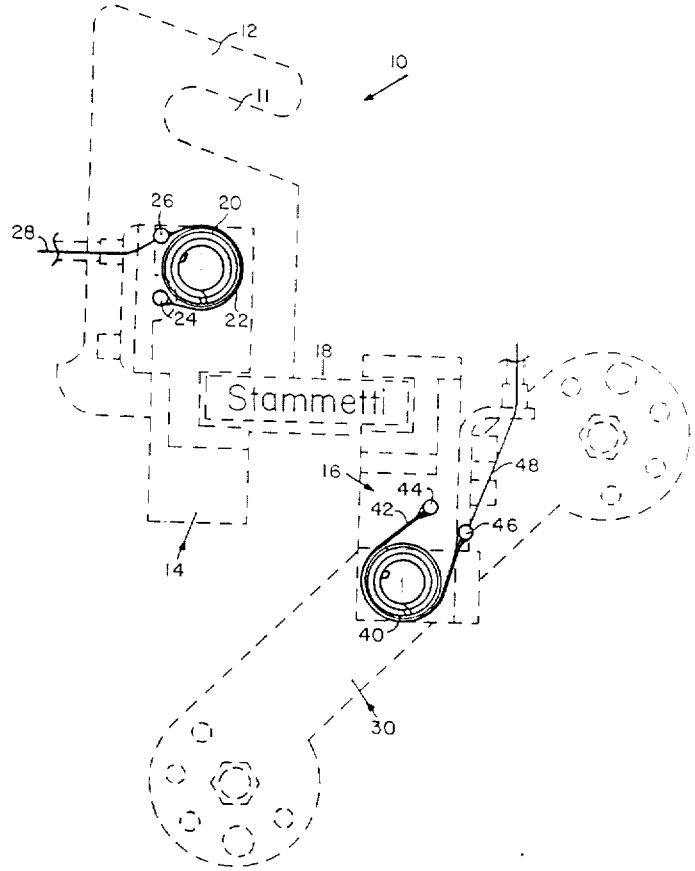

What is claimed is:

1. A derailleur assembly comprising:
    (a) a hanger plate for mounting a derailleur to a frame of a bicycle,
    (b) an upper pivot member pivotally mounting a rear end support to the hanger plate,
    (c) a lower pivot member pivotally mounting a front end support to the chain cage,
    (d) a parallelogram joining the rear end support to the front end support,
    (e) an upper lock for securing the upper pivot member against rotation, and
    (f) a lower lock for securing the lower pivot member against rotation.

2. The derailleur assembly as set out in claim 1 wherein the upper and lower locks each comprise a flexible band material.

3. The derailleur assembly as set out in claim 2 wherein the flexible material is a metal strip.

4. The derailleur assembly as set out in claim 3 wherein the metal strip further includes a coating thereon to improve the frictional grip of the strip.

5. The derailleur assembly as set out in claim 4 wherein the coating is rubber or plastic.

6. The derailleur assembly as set out in claim 1 wherein the upper and lower locks each comprise a ratchet member.

7. The derailleur assembly as set out in claim 6 wherein each ratchet member comprises ratchet teeth provided on the periphery of the upper and lower pivot members and a pawl device mounted on the front and rear end support in operable relationship to the ratchet teeth.

8. The derailleur assembly as set out in claim 1 further including a cable activation assembly for operating the upper and lower locks.

9. The derailleur assembly as set out in claim 8 wherein the cable activation assembly comprises an upper cable joining the upper lock and a lower cable joining the lower lock to a handle bar lever mounted on the frame of the bicycle.

10. The derailleur assembly as set out in claim 9 wherein the handle bar lever comprises a friction lever mounted on a handle bar of the bicycle.

11. The derailleur assembly as set out of claim 10 wherein the friction lever has adjustment means for varying the force necessary to move the lever.

12. The derailleur assembly as set out of claim 11 wherein the adjustment means is a wing nut.

13. The derailleur assembly as set out in claim 9 wherein the handle bar lever comprises a ratchet lever mounted on a handle bar of the bicycle.

14. The derailleur assembly as set out of claim 13 wherein the ratchet lever has adjustment means for varying the force necessary to move the lever.

15. The derailleur assembly as set out of claim 14 wherein the adjustment means is a wing nut.

16. The derailleur assembly as set out in claim wherein the cable activation assembly comprises an upper cable joining the upper lock to a spring mounted on the frame of the bicycle and a lower cable joining the lower lock to the spring.

17. The derailleur assembly as set out in claim further including a lever cable joining the spring to a handle bar lever whereby when the handle bar lever is activated the lever cable stretches the spring which causes the tension on the upper and lower cable wires to be released causing the upper and lower locks to loosen.

18. A derailleur assembly comprising:
    (a) a hanger plate for mounting a derailleur to a frame of a bicycle,
    (b) an upper pivot member pivotally mounting a rear end support to the hanger plate,
    (c) a lower pivot member pivotally mounting a front end support to the chain cage,
    (d) a parallelogram joining the rear end support to the front end support, and
    (e) an upper lock for securing the upper pivot member against rotation.

19. The derailleur assembly as set out in claim wherein the upper lock comprises a flexible band material.

20. The derailleur assembly as set out in claim wherein the flexible material is a metal strip.

21. The derailleur assembly as set out in claim wherein the metal strip further includes a coating thereon to improve the frictional grip of the strip.

22. The derailleur assembly as set out in claim wherein the coating is rubber or plastic.

23. The derailleur assembly as set out in claim wherein the upper lock comprises a ratchet member.

24. The derailleur assembly as set out in claim wherein the ratchet member comprises ratchet teeth provided on the periphery of the upper pivot member and a pawl device mounted on the rear end support in operable relationship to the ratchet teeth.

25. The derailleur assembly as set out in claim 18 further including a cable activation assembly for operating the upper band lock.

26. The derailleur assembly as set out in claim wherein the cable activation assembly comprises an upper cable joining the upper lock to a handle bar lever mounted on the frame of the bicycle.

27. The derailleur assembly as set out in claim wherein the handle bar lever comprises a friction lever mounted on a handle bar of the bicycle.

28. The derailleur assembly as set out of claim wherein the friction lever has adjustment means for varying the force necessary to move the lever.

29. The derailleur assembly as set out of claim wherein the adjustment means is a wing nut.

30. The derailleur assembly as set out in claim wherein the handle bar lever comprises a ratchet lever mounted on a handle bar of the bicycle.

31. The derailleur assembly as set out of claim wherein the ratchet lever has adjustment means for varying the force necessary to move the lever.

32. The derailleur assembly as set out of claim wherein the adjustment means is a wing nut.

33. The derailleur assembly as set out in claim wherein the cable activation assembly comprises an upper cable joining the upper band lock to a spring mounted on the frame of the bicycle.

34. The derailleur assembly as set out in claim further including a lever cable joining the spring to a handle bar lever whereby when the handle bar lever is activated the lever cable stretches the spring which causes the tension on the upper cable to be released causing the upper band lock to loosen.

35. A derailleur assembly comprising:
    (a) a hanger plate for mounting a derailleur to a frame of a bicycle,
    (b) an upper pivot member pivotally mounting a rear end support to the hanger plate, (c) a lower pivot member pivotally mounting a front end support to the chain cage, (d) a parallelogram joining the rear end support to the front end support, and (e) a lower lock for securing the lower pivot member against rotation.

36. The derailleur assembly as set out in claim 35 wherein the lower lock comprises a flexible band material.

37. The derailleur assembly as set out in claim 36 wherein the flexible material is a metal strip.

38. The derailleur assembly as set out in claim 37 wherein the metal strip further includes a coating thereon to improve the frictional grip of the strip.

39. The derailleur assembly as set out in claim 38 wherein the coating is rubber or plastic.

40. The derailleur assembly as set out in claim 35 wherein the lower lock comprises a ratchet member.

41. The derailleur assembly as set out in claim 40 wherein the ratchet member comprises ratchet teeth provided on the periphery of the lower pivot member and a pawl device mounted on the front end support in operable relationship to the ratchet teeth.

42. The derailleur assembly as set out in claim 35 further including a cable activation assembly for operating the lower lock.

43. The derailleur assembly as set out in claim 42 wherein the cable activation assembly comprises an lower cable joining the lower lock to a handle bar lever mounted on the frame of the bicycle.

44. The derailleur assembly as set out in claim 43 wherein the handle bar lever comprises a friction lever mounted on a handle bar of the bicycle.

45. The derailleur assembly as set out of claim 44 wherein the friction lever has adjustment means for varying the force necessary to move the lever.

46. The derailleur assembly as set out of claim 45 wherein the adjustment means is a wing nut.

47. The derailleur assembly as set out in claim 43 wherein the handle bar lever comprises a ratchet lever mounted on a handle bar of the bicycle.

48. The derailleur assembly as set out of claim 47 wherein the ratchet lever has adjustment means for varying the force necessary to move the lever.

49. The derailleur assembly as set out of claim 48 wherein the adjustment means is a wing nut.

50. The derailleur assembly as set out in claim 42 wherein the cable activation assembly comprises a lower cable joining the lower band lock to a spring mounted on the frame of the bicycle.

51. The derailleur assembly as set out in claim 47 further including a lever cable joining the spring to a handle bar lever whereby when the handle bar lever is activated the lever cable stretches the spring which causes the tension on the lower cable to be released causing the lower band lock to loosen.

* * * * *

UNITED STATES PATENT AND TRADEMARK OFFICE
CERTIFICATE OF CORRECTION

PATENT NO. : 4,891,036

DATED : January 2, 1990

INVENTOR(S) : John J. Stammetti

It is certified that error appears in the above-identified patent and that said Letters Patent is hereby corrected as shown below:

The title page should be deleted to appear as per attached title page.

The sheets of drawing consisting of Figures 1-5 should be deleted to appear as per attached sheets.

Signed and Sealed this

Tenth Day of July, 1990

Attest:

HARRY F. MANBECK, JR.

Attesting Officer

Commissioner of Patents and Trademarks

United States Patent [19]

Stammetti

[11] Patent Number: 4,891,036
[45] Date of Patent: Jan. 2, 1990

[54] MODIFIED DERAILLEUR

[76] Inventor: John J. Stammetti, 22636 Ocean Ave., #20, Torrance, Calif. 90505

[21] Appl. No.: 358,562

[22] Filed: May 26, 1989

[51] Int. Cl.⁴ ............................................. F16H 9/00
[52] U.S. Cl. ........................................................ 474/82
[58] Field of Search ................................... 474/78–82; 280/238, 261

[56] References Cited

U.S. PATENT DOCUMENTS

| | | | |
|---|---|---|---|
| 2,139,397 | 12/1938 | Wigglesworth | 474/135 X |
| 2,491,121 | 10/1946 | Lozinski | 474/80 |
| 3,156,130 | 11/1964 | Gant | 474/151 |
| 3,890,847 | 6/1975 | Dian | 280/238 X |
| 4,198,873 | 4/1980 | Nagano et al. | 474/82 |
| 4,226,132 | 10/1980 | Nagano et al. | 474/82 |
| 4,305,711 | 12/1981 | Lannoch | 474/82 |
| 4,507,101 | 3/1985 | Nagano | 474/82 |
| 4,552,546 | 11/1985 | Ishikawa | 474/82 |
| 4,573,949 | 3/1986 | Nagano | 474/80 |
| 4,610,644 | 9/1986 | Nagano | 474/82 |
| 4,637,809 | 1/1987 | Nagano | 474/80 |
| 4,699,605 | 10/1987 | Jona | 474/82 |

Primary Examiner—Thuy M. Bui
Attorney, Agent, or Firm—Quirk, Tratos & Roethel

[57] ABSTRACT

A derailleur is provided with locking devices in the form of bands or ratchets around the upper and lower pivoting members of the derailleur to hold the derailleur securely in place during use and thus preventing the bicycle chain from disengaging from the chain sprocket or the chain wheels. The locking devices are activated/deactivated by a hand lever mounted on the handle bar of the bicycle. A cable runs from the hand lever through a spring arrangement to other cables that are connected to the locking devices.

51 Claims, 3 Drawing Sheets